United States Patent [19]

Van Den Berg

[11] 4,000,095
[45] Dec. 28, 1976

[54] METHOD FOR PREPARING MATERIALS CONTAINING MINERALS AND SYNTHETIC SUBSTANCES AND MATERIALS MANUFACTURED ACCORDING TO SAID METHOD AND OBJECTS CONSISTING OF SAID MATERIALS

[75] Inventor: Antoon J. Van Den Berg, Epe, Netherlands

[73] Assignees: Hollandsche Wegenbouw Zanen B.V., Heemstede; Olster Asphalt Fabriek B.V., Olst, both of Netherlands

[22] Filed: Nov. 19, 1974

[21] Appl. No.: 525,139

[30] Foreign Application Priority Data

Nov. 19, 1973  Netherlands .................... 7315833

[52] U.S. Cl. ............................ 260/2.3; 260/28 R; 260/28.5 AS; 260/28.5 R; 260/37 R; 260/40 R; 260/42; 260/42.46; 260/42.49; 404/17
[51] Int. Cl.$^2$ ............... C08J 11/04; C08L 23/06; C08L 95/00
[58] Field of Search ......... 260/2.3, 42.46, 28.5 AS, 260/28.5 R, 28; 404/17

[56] References Cited
UNITED STATES PATENTS

| 3,112,681 | 12/1963 | Gessler | 260/42.46 |
| 3,336,252 | 8/1967 | Raichle et al. | 260/42.46 |

FOREIGN PATENTS OR APPLICATIONS 307,960  6/1973  Austria

*Primary Examiner*—Wilbert J. Briggs, Sr.
*Attorney, Agent, or Firm*—Sughrue, Rothwell, Mion, Zinn & Macpeak

[57] ABSTRACT

A building or road construction material, and method for its formation, which comprises (1) mineral components such as sand, gravel, diminuted glass, etc., (2) polymeric components such as polyethylene, polypropylene, polyvinyl chloride, polystyrene, etc., and (3) hydrocarbon-containing component such as tar pitch, bituminous products, petroleum coke, etc. combined in a special proportion to produce materials with improved properties such as a particularly large Marshall stability, a large compression strength and an excellent fluting, tracking and crack resistance. According to the method, the mineral component is first heated to a temperature of at least 180° C and then mixed with the polymeric component in diminutive form, in which the percentage by weight of polymeric components amounts to at most 100 percent, calculated on the amount by weight of the hydrocarbon component, and then to this resulting mixture is added the hydrocarbon component, provided that, if a bituminuous product is used as the hydrocarbon component, the percentage by weight of the polymeric component should in addition amount to at least 20 percent by weight, calculated on the amount of bitumen. The final mixture is then allowed to cool to form the desired product.

13 Claims, No Drawings

METHOD FOR PREPARING MATERIALS CONTAINING MINERALS AND SYNTHETIC SUBSTANCES AND MATERIALS MANUFACTURED ACCORDING TO SAID METHOD AND OBJECTS CONSISTING OF SAID MATERIALS

The invention relates to a method for preparing a material consisting of mineral components, polymeric components and a third component, according to which, prior to the addition of the third component, the pre-heated mineral components are mixed with the polymeric components, as well as to material obtained according to said method.

Such a method is known from the Netherlands patent application No. 71.08690. This patent application relates to the preparation of bituminous compositions which also contain mineral aggregates and a polymer and which are suitable to be used in road constructions. In this case, the use of the polymer aims at improving the rheological properties of bitumina. The polymer used must have a special character, namely a synthetic rubber of the block copolymer type having the general formula A-B-A, in which A and B represent different thermoplastic non-elastomeric polymer blocks, for example polystyrene-polyisoprene-polystyrene, and for preparing the bituminous compositions it is mixed with the bituminous component in the presence of at least part of the mineral aggregate. According to the said patent application this mixing may be effected in various ways:

a. adding the block copolymer to a mixture of the bituminous component and the mineral aggregate.

b. mixing the block copolymer with the total amount of mineral aggregate, before the bituminous component is added.

c. mixing the block copolymer with part of the mineral aggregate whereupon the rest of the mineral aggregate is added, before the bituminous component heated to 135°–185° C is added.

The total amount of aggregate can be previously dried at an increased temperature, for example 200° C.

d. mixing the block copolymer with a part of the mineral aggregate and adding said mixture to a mixture of the bituminous component and the remainder of the mineral aggregate.

In these mixing methods the block copolymer is used as a powder or as a solution in a volatile solvent. The amount of block copolymer used amounts to 1 to 20% by weight calculated on the bituminous component. The amount of block copolymer plus bituminous component amounts to 1 to 15% by weight calculated on the quantity of mineral aggregate. Therefore, the polymeric component is present in an amount of at most 1 to 5 calculated on the bituminous component, which means a considerable excess of bituminous components relative to the polymeric components.

The Netherlands patent application No.69.00269 describes a method for preparing a material by mixing preheated mineral components with 10–25% by weight of waste plastics and heating the mixture to a temperature at least equal to the melting temperature of the components of the waste plastics having the highest melting point. It is required that the plastic components are thermoplastic resins in which minor amounts of thermo-setting resins may be present. These materials may be used for purposes of building and/or road construction and hydraulic engineering.

Finally, the Netherlands patent application No. 73.05619 proposes a method for preparing a material consisting of mineral components, of diminuted products composed of various polymers, if required in the form of diminuted waste material, and of products containing hydrocarbons, such as tar pitch products rich in aromatics and bituminous tar pitch products, oil- and waxlike products rich in aromatics, petroleum coke and/or light petroleum fractions rich in aromatics, in quantities of at most 100% by weight, calculated on the amount by weight of polymeric components, to which one or more additives are added, if required.

The invention in question now relates to a method for preparing materials, particularly for use in road constructions, with improved properties such as a particularly large Marshall stability, a large compression strength and an excellent fluting, tracking and crack resistance, in which, besides mineral components, diminuted polymers and products containing hydrocarbons are used in a special proportion. The method is characterized in that the mineral components are first heated to a temperature of at least 180° C, whereupon the non-heated diminuted polymeric components and subsequently the components consisting of hydrocarbons are added, in which the percentage by weight of polymeric components amounts to at most 100%, calculated on the amount by weight of component containing hydrocarbons, provided that, if a bituminous product is used as the component containing hydrocarbons, the percentage by weight of polymeric components should in addition amount to at least 20%, calculated on the amount by weight of bitumen.

The combination of the special method and the relation between the composing constituents surprisingly leads to materials with unexpectedly favourable properties.

With respect to the method to be applied it is observed that materials with favourable properties are obtained exclusively via the method according to the invention, in which first the mineral components are heated, after which the non-heated diminuted polymeric components and, finally, the components containing hydrocarbons are added. In the examples of comparison stated below the results are explained in case of partial deviation from the method according to the invention. In Example of Comparison I, no components containing hydrocarbons are used; in Example of Comparison II the mineral component is not preheated; in Example of Comparison III coarse polymeric components are used; in Example of Comparison IV preheated diminuted polymeric components are used; in Example of Comparison V the preheated mineral components are first mixed with the components containing hydrocarbons before the polymeric components are added; in Example of Comparison VI, finally, preheated mineral components are mixed with a blend of components containing hot hydrocarbons and diminuted polymeric components.

In the present invention, one may add as mineral components all components suitable for the purpose of application of the materials. For road constructions, sand and mixtures of sand and gravel are preferred. However, for certain applications, the sand may be replaced entirely, for the greater part or to a minor extent by diminuted glass, for example originating from industries working waste, slags originating from blast furnaces, metallurgical works and refuse incinerators etc.

As polymeric components mainly thermoplastic polymers, for example polyethylene, polypropylene, polybutylene, polyvinyl chloride, polyamides, thermoplastic polyesters, polyacrylates etc. are used. The origin of said polymeric components is not important, provided these constituents are or become diminuted. Therefore, the polymeric components, as for instance granulated manufactured raw materials, intentionally diminuted raw materials or waste products of the polymer production may be used. For example from an environmental point of view, however, the so-called domestic waste plastics of particular importance. Said waste products which, due to their difficult disintegration, cannot be or hardly be removed from the environment, may be processed into useful products by means of the method according to the invention. The only condition is that the waste plastics are reduced to relatively small dimensions. Naturally, said waste products consist of a great number of different synthetic substances the greater part of which, however, are thermoplastic resins. A relatively low percentage of thermosetting resins is no objection for the processing since said thermosetting resins are incorporated as fillers. Small percentages of other products present by chance are no objection either.

With respect to the shape and the dimensions of the diminuted polymeric components it is to be noted that the shape is of minor importance so that consequently scales, granules, grains, coarse millings, scrap and cut or broken pieces and the like may be efficiently used and that the dimensions may also vary to a large extent, mostly depending on the aimed application.

For road constructions, the amount of the polymeric components to be used varies preferably from 0.3 to 10% by weight, calculated on the amount by weight of the mineral components, depending on the properties desired in the final product, such as wear resistance, elasticity, ruggedness, stability, compression strength and the like. Depending on the aimed application, the content of polymeric components may be greater or smaller.

As components containing hydrocarbons, for example tar pitch products rich aromatics, bituminous tar pitch products, oil and waxlike products rich in aromatics, petroleum coke, light petroleum fractions rich in aromatics, so-called synthetic bitumen, styrene and the like, are used. The question of which products will be used again depends on the object in view. For road constructions the usual bituminous products and coal tar products will generally be used. For coloured materials, no bituminous products or as little as possible will generally be used since this will interfere with the pigmenting. The amounts of components containing hydrocarbons to be used will preferably vary between 3 and 10% by weight, calculated on the amount by weight of mineral components.

Further, it is possible to incorporate the usual fillers and/or additives in the materials. As already previously stated, pigments may be applied as additives. Depending on their nature, the fillers and additives are added to the mineral component or to the polymeric component. For example, it is obvious to add thermosetting resins acting as a filler together with the polymeric component.

The materials obtained according to the method of the invention excel in favourable properties. As is apparent from the examples and the tables drawn up from these examples, materials suitable for road surfaces having a Marshall stability of 1,850 to 4,700 Kg at 60° C and a compression strength acccording to the Proctor method of 75 to 130 Kg/cm$^2$ are obtained.

Furthermore, it has been found that the crack sensitivity of the final product may be influenced, as a result of which an uninterrupted road surface may be realised. As less polymeric components are present the crack sensitivity will decrease.

It is surprising that the processing of the material according to the invention with 20 to 25% by weight of polymeric components calculated on the amount by weight of components containing hydrocarbons could be so simple carried out with conventional spreader machines and rollers that there may even be question of a remarkable improvement in respect of the processing of the bituminous mixtures known thus far.

EXAMPLE OF COMPARISON I

Sand is heated to 200°–250° C and 4 to 10% by weight of non-heated diminuted polyethylene is added, calculated on the amount of sand. The result is a mixture which cannot or hardly be worked up into a road surface on a large scale. The temperature range for applying the material is too short and rolling immediately produces permanent cracks.

EXAMPLE OF COMPARISON II

Cold sand is mixed with diminuted polymeric components and this mixture is heated to 200°–250° C. There is no binding or insufficient binding, the mixture falls apart and has, therefore, poor mechanical properties.

EXAMPLE OF COMPARISON III

Heated sand is mixed with large pieces of waste plastics. Some binding results but only with difficulty.

EXAMPLE OF COMPARISON IV

Heated sand is mixed with diminuted polymeric components which are heated to the softening point before mixing. There are no satisfactory mixing results and, therefore, no or insufficient cohesion takes place.

EXAMPLE OF COMPARISON V

Heated sand is mixed with bitumen and, subsequently, diminuted polymeric components are added while continuously stirring. There are no satisfactory mixing results; the mixing accumulates to lumps.

EXAMPLE OF COMPARISON VI

Heated sand is mixed with a mixture of hot bitumen and diminuted polymeric components. No satisfactory mixing is obtained and the results are distinctly worse than those in Examples I–V.

EXAMPLE OF COMPARISON VII

Heated sand is mixed with diminuted thermosetting polymeric components. There are no binding results and the thermosetting resin may burn at too high temperatures.

EXAMPLE I 1 ton of sand is heated in a mixing chamber to 240° C and 12 Kg of non-heated diminuted (shredded) polyethylene is added while continuously stirring and mixed during 15 seconds. Thereupon, 58 Kg of bitumen preheated to 160° C is added to this mixture, corresponding to 20.7% by weight of polymer calculated on bitumen. After 30 seconds of mixing, the product is ready for transportation and applied by the spreader machine as an uninterrupted road surface and finished by a number of roller runs. At the working up, the temperature may decrease to at least 130° C without deterioration of the properties of the final product.

PROPERTIES

Marshall stability, measured at 60° C (according to the standards of the Dutch Ministry of Public Works 1972): 1,850 Kg.

Compression strength, determined with cylinders manufactured according to the Proctor method (according to the standards of the Dutch Ministry of Public Works): 75 Kg/cm$^2$.

EXAMPLE II

The processing is carried out according to the method as described in Example I, with the exception, however, that instead of 12 Kg polyethylene, 20 Kg polyethylene (= 34.5% polymeric components) are used.

Marshall stability: 2,350 Kg.
Compression strength: 80 Kg/cm$^2$.

EXAMPLE III

The processing is carried out according to the method as described in Example I with the exception, however, that instead of 12 Kg polyethylene, 30 Kg polyethylene (= 51.8% polymeric components) are used.

Marshall stability: 2,750 Kg.
Compression strength: 85 Kg/cm$^2$.

EXAMPLE IV

The processing is carried out according to the method as described in Example I with the exception, however, that instead of 12 Kg polyethylene, 40 Kg polyethylene (= 69% polymeric components) are used.

Marshall stability: 3.000 Kg.
Compression strength: 85 Kg/cm$^2$.

In Table A the results of these examples have been summarised. Also, the shrinkage of the mixture obtained is stated in this table. This shrinkage, which may cause cracks, appears due to temperature differences.

TABLE A

| | Examples | | | |
|---|---|---|---|---|
| | I | II | III | IV |
| Sand in Kg | 1,000 | 1,000 | 1,000 | 1,000 |
| Polyethylene in Kg | 12 | 20 | 30 | 40 |
| Bitumen in Kg | 58 | 58 | 58 | 58 |
| Polymeric components with respect to components containing hydrocarbons in % by weight | 20.7 | 34.5 | 51.8 | 69 |
| Polymeric components with respect to total mixture in % by weight | 1.12 | 1.86 | 2.75 | 3.65 |
| Marshall stability in Kg | 1,850 | 2,350 | 2,750 | 3,000 |
| Compression strength in Kg/cm$^2$ | 75 | 80 | 85 | 85 |
| Shrinkage in 10$^{-6}$ m/m ° C | 11 | 13.5 | 18 | 24 |

EXAMPLE V

The processing is carried out according to the method as described in Example I with the exception, however, that instead of 58 Kg bitumen, 58 Kg tar product and instead of 12 Kg polyethylene, 8 Kg polyethylene (= 13.4% polymeric components) are used.

Marshall stability: 2,300 Kg.
Compression strength: 115 Kg/cm$^2$.

EXAMPLE VI

The processing is carried out according to the method as described in Example V with the exception, however, that instead of 8 Kg polyethylene, 12 Kg polyethylene (= 20.7% polymeric components) are used.

Marshall stability: 3,000 Kg.
Compression strength: 125 Kg/cm$^2$.

Example VII

The processing is carried out according to the method as described in Example V with the exception, however, that instead of 8 Kg polyethylene, 20 Kg polyethylene (= 34.5% polymeric components) are used.

Marshall stability: 4,000 Kg.
Compression strength: 130 Kg/cm$^2$.

EXAMPLE VIII

The processing is carried out according to the method as described in Example V with the exception, however, that instead of 8 Kg polyethylene, 30 Kg polyethylene (= 51.8 Kg polymeric components) are used.

Marshall stability: 4,700 Kg.
Compression strength: 130 Kg/cm$^2$.

The results of Examples V – VIII are summarised in Table B.

TABLE B

| | Examples | | | |
|---|---|---|---|---|
| | V | VI | VII | VIII |
| Sand in Kg | 1,000 | 1,000 | 1,000 | 1,000 |
| Polyethylene in Kg | 8 | 12 | 20 | 30 |
| Tar product in Kg | 58 | 58 | 58 | 58 |
| Polymeric components with respect to components containing hydrocarbons in % by weight | 13.4 | 20.7 | 34.5 | 51.8 |
| Polymeric components with respect to total mixture in % by weight | 0.75 | 1.12 | 1.86 | 2.75 |
| Marshall stability in Kg | 2,000 | 3,000 | 4,000 | 4,700 |
| Compression strength in Kg/cm$^2$ | 115 | 125 | 130 | 130 |
| Shrinkage in 10$^{-6}$ m/m ° C | 10.3 | 10.6 | 11 | 11.3 |

From the results of Table B it appears that a particularly large Marshall stability and a large compression strength may be obtained while there is practically no increase in shrinkage with increasing quantities of polymer.

Moreover, it appears from the results that a great range of Marshall stability values may be covered by means of the method according to the invention. On the other hand, this implies that a suitable receipe may be drawn up for each field of application with its own Marshall stability and compression strength.

Although separately bitumen or tar product are used in the examples, it is obvious that mixtures of these components may be used in any ratio.

One and the same amount of bitumen or tar product was constantly used in the examples since such an amount is mostly applied in practice. However, as already stated before, other quantities may likewise be applied with similar results.

I claim:

1. A method for preparing a material consisting essentially of a mineral component, a thermoplastic polymeric component, and bitumen, said method comprising sequentially:
   1. heating the mineral component to a temperature of at least 180° C;
   2. mixing with the heated mineral component of (1) the polymeric component, said polymeric component being in diminutive form, said polymeric component being at least 20wt.% and at most 100wt.% of the weight of the bitumen;
   3. mixing with said mixture of (2) the bitumen which has been previously heated; and
   4. allowing the material product of (3) cool.

2. A method according to claim 1, wherein said diminutive polymeric component comprises a mixture of diminutive thermoplastic polymers selected from the group of diminutive polyethylene, polypropylene, polybutylene, polyvinyl chloride, polyacrylates, polyamides, polyesters, polyethylene imines, polystyrene, and copolymers thereof.

3. A method according to claim 2, wherein said diminutive polymeric component is selected from the group of industrial waste plastics and domestic waste plastics.

4. A method according to claim 1, wherein said diminutive polymeric component is used in the form of chips, granules, grains, coarse millings, shreds, cut pieces, or broken pieces.

5. A method according to claim 1, wherein said diminutive polymeric component is used in an amount of 0.3 to 10% by weight, calculated on the amount by weight of the mineral components.

6. A method according to claim 1, wherein said mineral component is selected from sand, gravel, diminuted glass and slags.

7. A method according to claim 6, wherein said mineral component is diminutive glass or slages originating from blast furnaces, metallurgical works and refuse incinerators.

8. A method according to claim 5, wherein said bitumen is used in an amount of 3 to 10% by weight, calculated on the amount by weight of said mineral component.

9. A method according to claim 1, wherein said mineral component comprises sand or a mixture of sand and gravel; said polymeric component comprises diminutive polyethylene in an amount of 1 to 3% by weight, calculated on the amount by weight of said mineral component; and said bitumen is used in an amount of 5 to 8% by weight, calculated on the amount by weight of said mineral component.

10. A method according to claim 1, wherein pigments are added to said material.

11. A road surface construction comprising the material prepared by the method of claim 1.

12. A road surface construction comprising the material prepared by the method of claim 8.

13. A road surface construction comprising the material prepared by the method of claim 9.

* * * * *